United States Patent
Dominici et al.

(10) Patent No.: US 9,245,498 B2
(45) Date of Patent: Jan. 26, 2016

(54) DISPLAY SYSTEM HAVING A SEMITRANSPARENT DISPLAY DEVICE DISPLAYING SYMBOLS WITH A CONTRASTED OUTLINE

(71) Applicant: Thales, Neuilly sur Seine (FR)

(72) Inventors: Johanna Dominici, Eysines (FR); Sebastien Ellero, Francesca (FR); Loic Becouarn, Pessac (FR)

(73) Assignee: Thales, Neuilly sur Seine (FR)

( * ) Notice: Subject to any disclaimer, the term of this patent is extended or adjusted under 35 U.S.C. 154(b) by 67 days.

(21) Appl. No.: 14/105,137

(22) Filed: Dec. 12, 2013

(65) Prior Publication Data
US 2014/0160154 A1    Jun. 12, 2014

(30) Foreign Application Priority Data

Dec. 12, 2012   (FR) ...................................... 12 03376

(51) Int. Cl.
| | |
|---|---|
| *G09G 5/00* | (2006.01) |
| *G09G 5/377* | (2006.01) |
| *G06F 3/14* | (2006.01) |
| *G09G 3/00* | (2006.01) |
| *G02B 27/01* | (2006.01) |

(52) U.S. Cl.
CPC ............ *G09G 5/377* (2013.01); *G02B 27/0101* (2013.01); *G06F 3/1438* (2013.01); *G09G 3/003* (2013.01); *G09G 5/00* (2013.01); *G02B 2027/0118* (2013.01); *G09G 2300/023* (2013.01); *G09G 2320/0238* (2013.01); *G09G 2320/0686* (2013.01); *G09G 2340/12* (2013.01); *G09G 2340/14* (2013.01); *G09G 2380/12* (2013.01)

(58) Field of Classification Search
None
See application file for complete search history.

(56) References Cited

U.S. PATENT DOCUMENTS

| | | |
|---|---|---|
| 5,808,711 A | 9/1998 | Suppelsa et al. |
| 2007/0008188 A1* | 1/2007 | Firra ............................ 340/973 |
| 2008/0192013 A1 | 8/2008 | Barrus et al. |
| 2010/0141689 A1 | 6/2010 | Johnson |
| 2011/0043435 A1 | 2/2011 | Hebenstreit et al. |

FOREIGN PATENT DOCUMENTS

EP    1 365 377 A2    11/2003

OTHER PUBLICATIONS

French Search Report for French Counterpart Application No. FR 1203376, 8 pgs. (Aug. 9, 2013).

* cited by examiner

*Primary Examiner* — Xiao Wu
*Assistant Examiner* — Mohammad H Akhavannik
(74) *Attorney, Agent, or Firm* — Blakely, Sokoloff, Taylor & Zafman LLP

(57) ABSTRACT

The general field of the invention is that of display systems comprising means for generating graphic symbols and an associated semitransparent display device. The display device according to the invention has two overlaid semitransparent flat display screens, one passive and the other active, each symbol displayed on the semitransparent display device comprising a first representation and a second representation. The first representation is displayed on the first display screen with a low transmission rate for the light and with a predetermined first size. The second representation is displayed on the second display screen in the same place as the first representation, with a luminance and a predetermined second size that is smaller than the first size so that the second representation is overlaid on the first representation and the displayed symbol appears bright with a dark border.

4 Claims, 2 Drawing Sheets

DISPLAY SYSTEM HAVING A SEMITRANSPARENT DISPLAY DEVICE DISPLAYING SYMBOLS WITH A CONTRASTED OUTLINE

BACKGROUND OF THE INVENTION

1. Field of the Invention

The field of the invention is that of display devices arranged in the cockpits of civil and military aircraft.

2. Description of the Prior Art

Currently, the control panels of modern aircraft cockpits have display screens and instruments on the greater part of their surface, thereby reducing direct sight of the outside landscape in the low area of the cockpit. In a certain number of applications, including flight by sight at low altitude, this absence of direct sight can be a nuisance.

A simple first solution consists in the pilot contorting himself to see above the display screens, when that is possible.

A second solution consists in using collimated display systems that are also called "see through". These systems essentially fall into two main categories, helmet visors worn on the head of the pilot and so-called "head-up display" devices permanently mounted in the cockpit. These devices overlay information in the form of imagery or symbol sets on the outside landscape.

The latter equipment has the distinctive feature of being collimated, i.e. the information that is output by a display is projected "into infinity" by means of suitable optics. Thus, the pilot does not need to focus on the information or on the landscape, the two being seen sharply at the same time. This equipment has a certain technical complexity and therefore a high cost. Moreover, the information is presented in a specific manner in order not to mask the landscape in the background, which involves a different representation from that of so-called "head-down" screens. The pilot must then put a certain amount of effort into his to-and-fro movements between the "ahead-up" and "head-down" screens to find his bearings.

A third solution consists in using semitransparent display screens which are placed in the field of vision of the user and which make it possible to project an image so as to be overlaid on the outside landscape. One of the difficulties of overlaying is that the luminance of the outside landscape can be highly contrasted and/or very bright. It is, of course, essential that, whatever the variations in luminance, the overlaid image remain perfectly legible without excessively dimming the sight of the outside landscape. It is possible to produce emissive screens with high luminance but these display screens remain expensive and consume a large amount of electricity.

SUMMARY OF THE INVENTION

The display system according to the invention does not exhibit these drawbacks. It has a display device having two overlaid semitransparent flat display screens, one passive and the other active. This arrangement makes it possible to display a symbol set with dark outlines that remains visible whatever the luminance level of the outside landscape.

More precisely, the subject of the invention is a display system comprising means for generating at least one graphic symbol and an associated semitransparent display device, characterized in that the display device has two overlaid semitransparent flat display screens, the first display screen being passive and operating by modulation of an external light, the second display screen being active and operating by emission of light, each symbol displayed on the semitransparent display device comprising a first representation and a second representation, the first representation being displayed on the first display screen with a low transmission rate for the light and with a predetermined first size, the second representation being displayed on the second display screen in the same place as the first representation, with a predetermined luminance and with a predetermined second size that is smaller than the first size so that the second representation is overlaid on the first representation and the displayed symbol appears bright with a dark border.

Advantageously, the display device has a transparent touch sensitive surface.

Advantageously, the display system is an aircraft control panel system.

BRIEF DESCRIPTION OF THE DRAWINGS

The invention will be better understood, and other advantages will become apparent, on reading the following description, given in a nonlimiting manner and with reference to the appended figures, among which.

DETAILED DESCRIPTION

Figure 1:
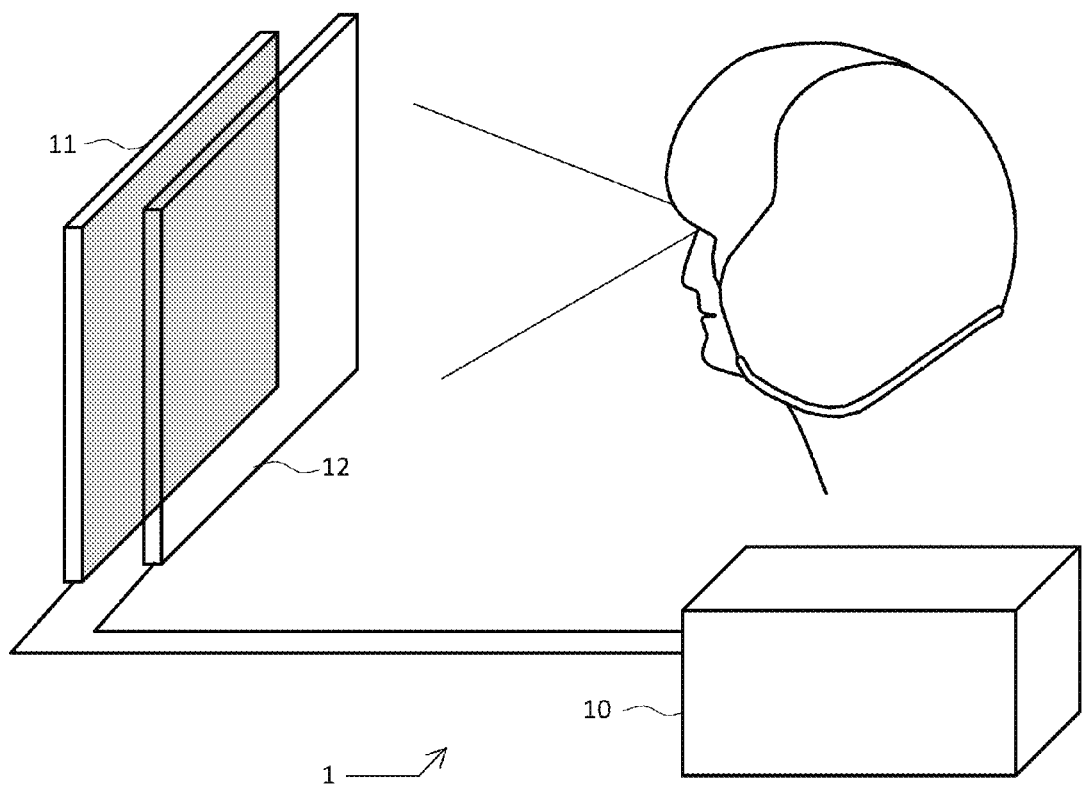
FIG. 1 shows a general view of the display system according to the invention.

By way of non-limiting example, a display system according to the invention is shown in FIG. 1 in an operational configuration. The system shown is a display system 1 for an aircraft control panel; it can be adapted to suit all types of vehicles requiring information to be overlaid on the outside.

It comprises:

an electronic computer 10 having first means for generating images and/or symbols and various computation and control means;

an associated semitransparent display device arranged in front of an outside landscape. This device has two overlaid semitransparent flat display screens 11 and 12. The term flat screen is understood to mean a screen of small thickness, not exceeding a few millimeters to a few centimeters. A flat screen is not necessarily planar, it can also be curved. In FIG. 1, these screens have been separated for the sake of clarity. The first display screen 11 is passive; its transmission rate is controlled by the first image generation means. By way of example, a passive or blocking screen of this kind may be a liquid crystal or "LCD" screen. It is arranged on the outside-landscape side. The second display screen 12 is active; its light emission is controlled by the first image generation means. It is arranged on the user side. By way of example, an emissive screen of this kind may be of "OLED" (Organic Light Emitting Diode) type. These two screens, transmissive and blocking, can be monochrome or colour.

The operation of the screens is as follows. Each graphic symbol is generated by the computer. It has a first representation and a second representation. The first representation is displayed on the first display screen with a low transmission rate for the light and with a predetermined first size, the second representation is displayed on the second display screen in the same place as the first representation, with a predetermined luminance and with a predetermined second size that is smaller than the first size so that the second representation is overlaid on the first representation and the displayed symbol appears bright with a dark border. The size of the dark border depends on the size of the symbols displayed. It must be thick enough to be clearly legible.

Figure 2:
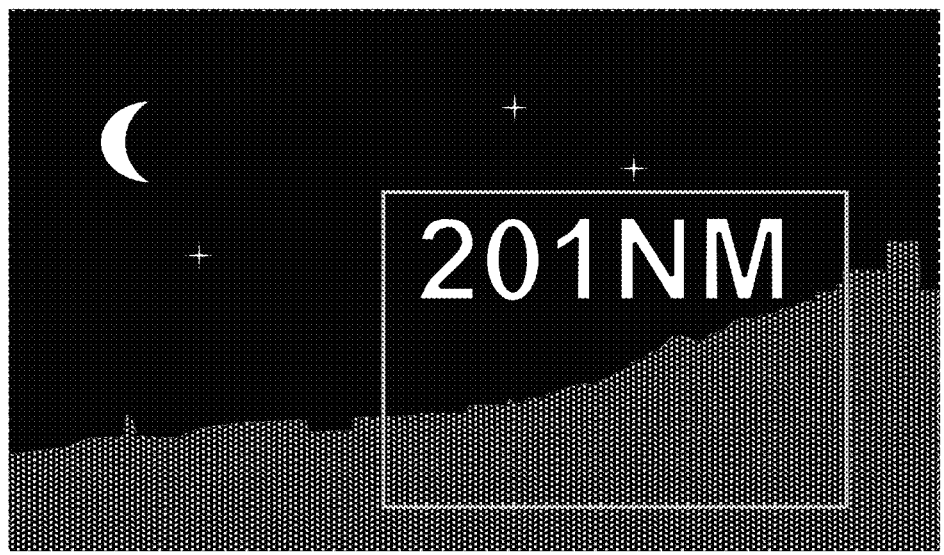
FIG. 2 shows the configuration of the screens in night mode at low brightness.
Figure 3:
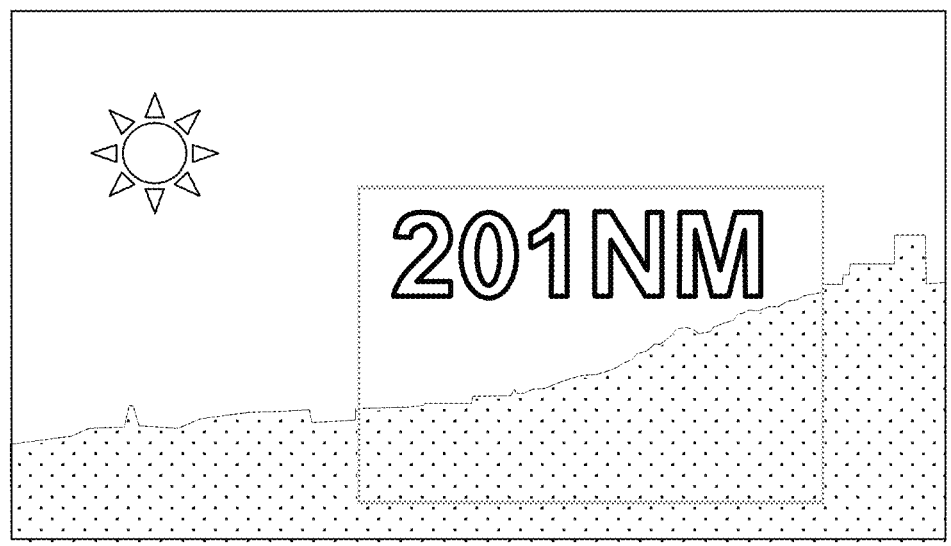
FIG. 3 shows the configuration of the screens in day mode at high brightness.

By way of example, FIGS. 2 and 3 show the display of the indication "201NM" in a system according to the invention. Each numeral and each letter composing this indication comprise a first "black" or opaque representation displayed by the first display screen and a second bright representation of smaller size displayed by the second display screen in such a way that each second representation is surrounded by a black border coming from the first representation. As can be seen in FIG. 2, when the outside luminance is low, the black border is barely visible. However, the symbols can be seen perfectly by virtue of the second bright representation. As can be seen in FIG. 3, when the outside luminance is high, the reverse occurs. The black border is easily visible whereas the second representation is drowned out by the luminous flux from outside.

This arrangement exhibits the advantage of giving good contrast whatever the outside level of lighting and without it being necessary to enslave the luminance or the contrast of the displayed symbols.

Optionally, the screen can become interactive while keeping its transparency by overlaying a transparent touch-sensitive surface on the display screens. Various possible technologies exist for producing a touch-sensitive surface. Examples that will be cited are:
  optical touch-sensitive technology: a light reflector is installed on the perimeter of the whole screen. A set of optical transmitter/receiver pairs is housed in the support system for the screen. Thus it is possible to detect the interactions of the pilot on this screen;
  projected capacitive technology: a capacitive touch-sensitive plate is adhesively bonded to each emissive plate or the touch-sensitive detection system is incorporated into the display screen.
  so-called "in-cell capacitive" technology: the sensors are incorporated into the screen, between the pixels.

What is claimed is:

1. A display system comprising:
  an electronic computer that generates and processes at least one graphic symbol; and
  an associated semitransparent display device that displays the at least one graphic symbol,
  wherein the display device has two overlaid semitransparent flat display screens, a first display screen of the two overlaid semitransparent flat display screens being passive and operating by modulation of an external light, and a second display screen of the two overlaid semitransparent flat display screens being active and operating by emission of light,
  wherein the at least one graphic symbol that is displayed on the display device comprises a first representation and a second representation, the first representation being displayed on the first display screen with a low transmission rate for the light and with a predetermined first size, the second representation being displayed on the second display screen in a same place as the first representation with a predetermined luminance and with a predetermined second size that is smaller than the first size so that the second representation is overlaid on the first representation and the at least one graphic symbol that is displayed on the display device appears bright with a dark border, the dark border coming from the first representation of the at least one graphic symbol and surrounding a shape of the second representation of the at least one graphic symbol.

2. The display system according to claim 1, wherein the display device has a transparent touch-sensitive surface.

3. The display system according to claim 2, wherein the display system is an aircraft control panel system.

4. The display system according to claim 1, wherein the display system is an aircraft control panel system.

* * * * *